(12) United States Patent
Wang et al.

(10) Patent No.: US 11,539,850 B2
(45) Date of Patent: Dec. 27, 2022

(54) PRINTER INCLUDING COPY AND SCAN FUNCTIONS

(71) Applicants: Hewlett-Packard Development Company, L.P., Houston, TX (US); Ren-San Wang, Shanghai (CN); Zhao-Yang Xu, Shanghai (CN); Shun-Wen Li, Shanghai (CN)

(72) Inventors: Ren-San Wang, Shanghai (CN); Zhao-Yang Xu, Shanghai (CN); Shun-Wen Li, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 1315 days.

(21) Appl. No.: 15/762,944

(22) PCT Filed: Jan. 6, 2016

(86) PCT No.: PCT/CN2016/070240
§ 371 (c)(1),
(2) Date: Mar. 23, 2018

(87) PCT Pub. No.: WO2017/117736
PCT Pub. Date: Jul. 13, 2017

(65) Prior Publication Data
US 2022/0201138 A1    Jun. 23, 2022

(51) Int. Cl.
*H04N 1/00* (2006.01)
*G03G 15/00* (2006.01)

(52) U.S. Cl.
CPC ......... *H04N 1/00525* (2013.01); *G03G 15/60* (2013.01); *H04N 1/00596* (2013.01); *H04N 1/00694* (2013.01); *G03G 2215/00126* (2013.01)

(58) Field of Classification Search
CPC .......... H04N 1/00525; H04N 1/00596; G03G 15/60; G06G 2215/00126
USPC .................................................. 358/1.1–1.18
See application file for complete search history.

(56) References Cited

U.S. PATENT DOCUMENTS

| | | |
|---|---|---|
| 5,710,634 A | 1/1998 | Kuriyama |
| 5,751,448 A | 5/1998 | Kim et al. |
| 5,794,099 A | 8/1998 | Sheldon et al. |
| 7,773,267 B2 | 8/2010 | Kim et al. |

(Continued)

FOREIGN PATENT DOCUMENTS

| CN | 1842118 A | 10/2006 |
|---|---|---|
| CN | 1842118 A | 10/2006 |

(Continued)

OTHER PUBLICATIONS

Patrick, Jason. The How-To Geek Guide to Buying the Right Printer. Jan. 2, 2012.—6 pages.

*Primary Examiner* — Gabriel I Garcia
(74) *Attorney, Agent, or Firm* — Michael Dryja

(57) ABSTRACT

Copy and scan printing may include scanning, by scanner disposed along a paper path between a paper delivery roller and a paper pickup roller, content of documents (302). Further, copy and scan printing may include determining whether the documents are to be copied (304), in response to a determination that the documents are to be copied, determining whether a page count of the documents to be copied is available (306), and generating copies of the documents (310).

14 Claims, 6 Drawing Sheets

(56) References Cited

U.S. PATENT DOCUMENTS

| | | |
|---|---|---|
| 8,832,678 B2 | 9/2014 | Tsuboi |
| 9,165,524 B2 | 10/2015 | Sohn et al. |
| 2005/0135855 A1 | 6/2005 | Park et al. |
| 2006/0227375 A1 | 10/2006 | Kamimura |
| 2007/0057428 A1 | 3/2007 | Luo |
| 2009/0015877 A1* | 1/2009 | Connors ............ G03G 15/5087 358/443 |
| 2011/0170139 A1* | 7/2011 | Shozaki ................ G03G 21/02 358/1.15 |
| 2016/0165089 A1* | 6/2016 | Goto ........................ H04N 1/10 358/1.16 |

FOREIGN PATENT DOCUMENTS

| | | |
|---|---|---|
| CN | 101102384 A | 1/2008 |
| CN | 101388946 A | 3/2009 |
| CN | 102196125 A | 9/2011 |
| JP | 2014090343 A | 5/2014 |

\* cited by examiner

300

```
┌─────────────────────────────────────────┐
│ SCAN, BY A SCANNER DISPOSED ALONG A     │
│ PAPER PATH BETWEEN A PAPER DELIVERY     │
│ ROLLER AND A PAPER PICKUP ROLLER,       │
│ CONTENT OF DOCUMENTS                    │
│ 302                                     │
└─────────────────────────────────────────┘
                    ↓
┌─────────────────────────────────────────┐
│ DETERMINE WHETHER THE DOCUMENTS ARE     │
│ TO BE COPIED                            │
│ 304                                     │
└─────────────────────────────────────────┘
                    ↓
┌─────────────────────────────────────────┐
│ IN RESPONSE TO A DETERMINATION THAT THE │
│ DOCUMENTS ARE TO BE COPIED, DETERMINE   │
│ WHETHER A PAGE COUNT OF THE DOCUMENTS   │
│ TO BE COPIED IS AVAILABLE               │
│ 306                                     │
└─────────────────────────────────────────┘
                    ↓
┌─────────────────────────────────────────┐
│ IN RESPONSE TO A DETERMINATION THAT THE │
│ PAGE COUNT OF THE DOCUMENTS TO BE       │
│ COPIED IS NOT AVAILABLE, SCAN THE       │
│ DOCUMENTS FROM AN INPUT TRAY UPON       │
│ REMOVAL OF ANY BLANK PAPERS FROM THE    │
│ INPUT TRAY AND PLACEMENT OF THE         │
│ DOCUMENTS IN THE INPUT TRAY             │
│ 308                                     │
└─────────────────────────────────────────┘
                    ↓
┌─────────────────────────────────────────┐
│ GENERATE COPIES OF THE DOCUMENTS BASED  │
│ ON THE SCAN OF THE DOCUMENTS FROM THE   │
│ INPUT TRAY                              │
│ 310                                     │
└─────────────────────────────────────────┘
```

FIG. 3

PRINTER INCLUDING COPY AND SCAN FUNCTIONS

BACKGROUND

A printer may be described as a peripheral which is used to make a persistent human readable representation of graphics or text on paper or similar physical media. Examples of printer mechanisms include black and white laser printers used for documents, and color inkjet printers which may be used to produce high quality photograph output.

BRIEF DESCRIPTION OF DRAWINGS

Features of the present disclosure are illustrated by way of example and not limited in the following figure(s), in which like numerals indicate like elements, in which:

FIG. 3 illustrates a flowchart of a method for copying and scanning, according to an example of the present disclosure;

DETAILED DESCRIPTION

Figure 1:
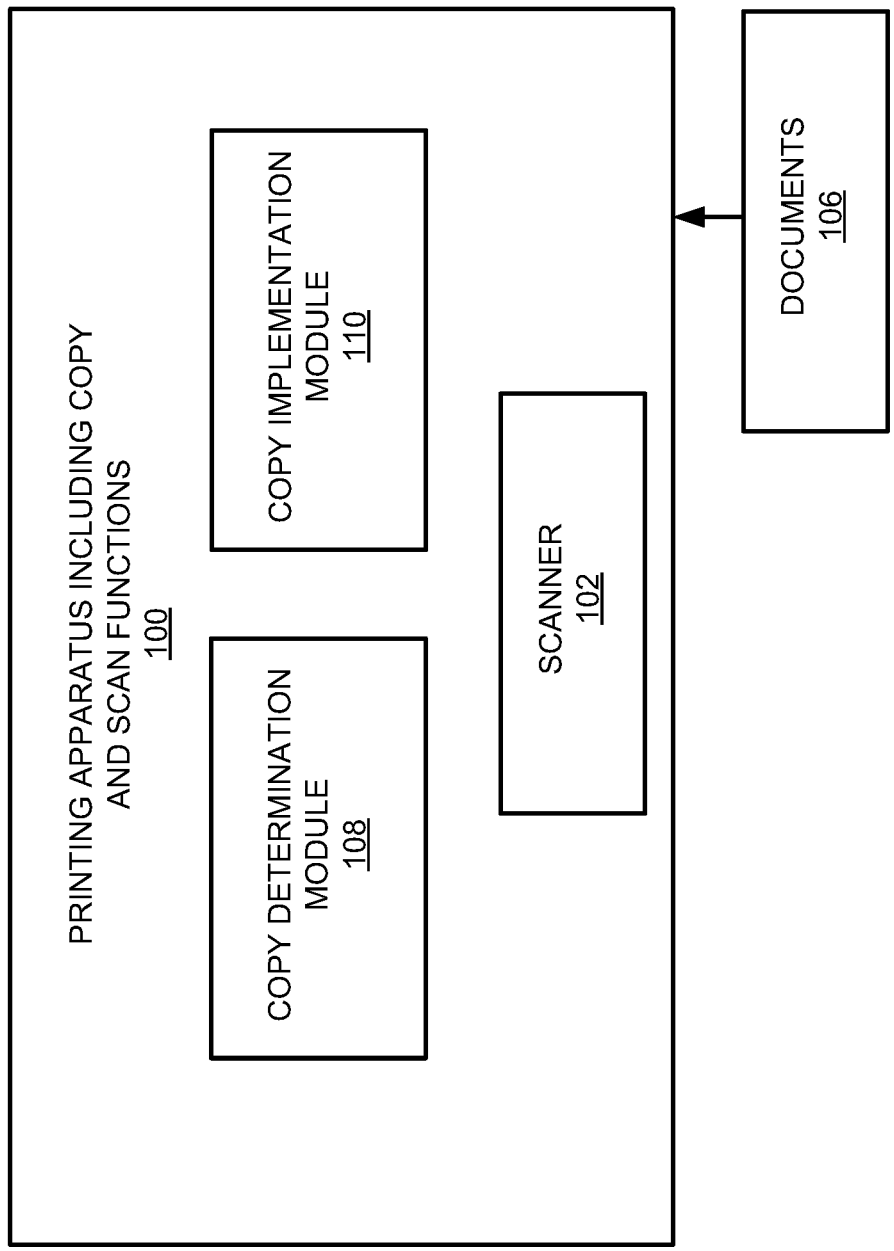
FIG. 1 illustrates a layout of a printing apparatus including copy and scan functions, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A printer may include various components for copying, scanning, etc., that add to the overall complexity of the printer. While elimination of such components may reduce the overall complexity of the printer, a user may nevertheless need such capabilities from time to time. For example, while a user may use a printer to print documents a majority of the time, from time to time, the user may need to copy a physical document (e.g., a paper document) to generate a duplicate document, and/or scan a physical document to save an electronic version of the physical document. If the capabilities of the printer available to the user is limited printing documents, the user may need to obtain a copy and scan machine to respectively perform the copy and scan functions.

In order to address the aforementioned technical challenges associated with complexities of printers that include components for copying and scanning, and other such functions, a printing apparatus including copy and scan functions and a method for copying and scanning are disclosed herein. For the apparatus and method disclosed herein, the printing apparatus may include copy and scan functions without any type of an automatic document feeder (ADF) associated with copying of a document that is fed to a copy receiving feeder of the printing apparatus, and without any type of flatbed (FB) scanner onto which documents that are to be scanned are placed.

According to examples, the apparatus and method disclosed herein may include a scanner (e.g., a scan bar) that is disposed along an engine paper path to enable single function printer scan and copy functions. According to examples, the printing apparatus disclosed herein may obtain (e.g., by picking up, or otherwise retrieving) a document (or documents) from an input tray, and scan the document, for example, to a personal computer memory, or otherwise copy the document on a blank paper. As disclosed herein, the document may be described as paper (or any other type of media) that includes text, graphics, or any type of information that is to be scanned and/or copied. The blank paper may be described as paper (or any other type of media) that is to be used to print text, graphics, or any type of information that is on the document, from the printing apparatus memory, from a memory of a personal computer or other such device connected to the printing apparatus, or from any other source (e.g., wireless device, etc.).

Figure 2:
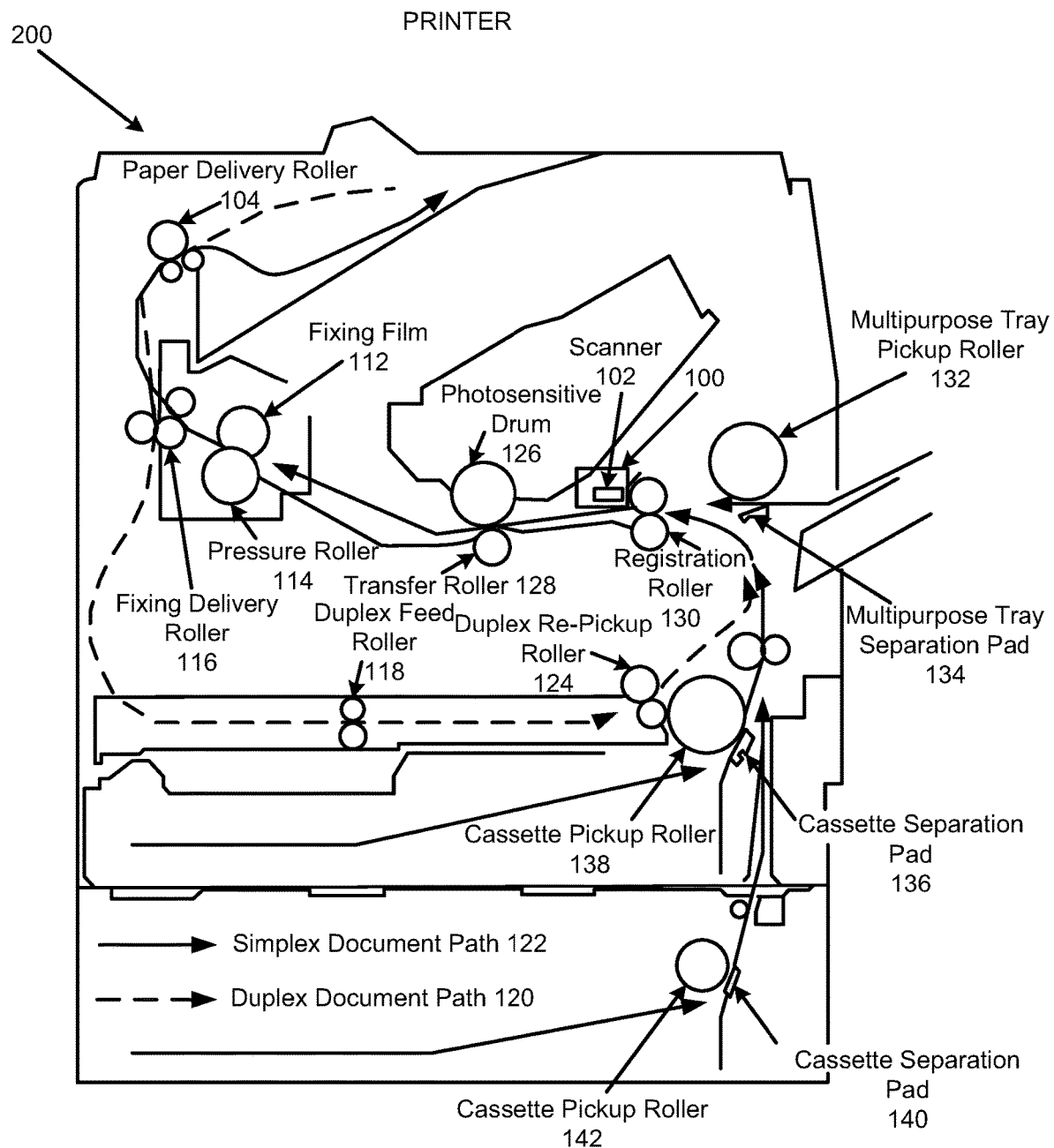
FIG. 2 illustrates an environment of the printing apparatus of FIG. 1, according to an example of the present disclosure.

FIG. 1 illustrates a layout of a printing apparatus including copy and scan functions (hereinafter also referred to as "apparatus 100"), according to an example of the present disclosure. According to examples, the apparatus 100 may include or be provided as a component of a laser printer, an inkjet printer, or any type of printer. For example, FIG. 2 illustrates an environment 200 of the apparatus 100, according to an example of the present disclosure. For the example of FIG. 2, the environment 200 may represent a printer which includes the apparatus 100 as a component thereof. Alternatively, the apparatus 100 (excluding the scanner as disclosed herein) may be disposed separately from the printer (illustrated in FIG. 2) to control various operations of the printer.

Referring to FIGS. 1 and 2, the apparatus 100 may include or otherwise utilize a scanner 102 disposed along a paper path between a paper delivery roller 104 (e.g., see FIG. 2) and a paper pickup roller (e.g., multipurpose tray pickup roller 132, cassette pickup roller 138, cassette pickup roller 142 as illustrated in FIG. 2, or another such pickup roller). The paper delivery roller 104 (which may be designated as a face-down delivery roller) may deliver printouts to an output bin (e.g., a bin provided on a top or side area of a printer). The scanner 102 may be configured to scan content of documents 106. For example, the scanner 102 may be configured to scan text, images, or any type of content of the documents 106, as the documents 106 are traversing the paper path between the paper delivery roller 104 and the paper pickup roller.

The apparatus 100 may include a copy determination module 108 to determine whether the documents 106 are to be copied. In response to a determination that the documents are to be copied, the copy determination module 108 may determine whether a page count of the documents 106 to be copied is available. In response to a determination that the page count of the documents 106 to be copied is available, a copy implementation module 110 may generate, based on the scanning of the content of documents 106, copies of the documents 106 based on the page count. In this regard, the scanner 102 may scan the content of the documents 106 from an input tray (e.g., a multipurpose tray, or the upper or lower cassettes for the example of FIG. 2) based on the page count, and generate, based on the scanning of the content of the documents 106, the copies of the documents 106 based on the page count. For example, if there are six documents 106 (i.e., the page count is six) that are to be copied, the copy implementation module 110 may generate, based on the scanning of the content of documents 106, copies of the documents 106 based on the page count of six, regardless of whether the input tray includes or does not include blank documents disposed below the documents 106.

In response to a determination that the page count of the documents 106 to be copied is not available, the copy implementation module 110 may generate a prompt (e.g., to a user of the apparatus 100 via a user interface) to place the documents 106 in an input tray (e.g., a multipurpose tray, or the upper or lower cassettes for the example of FIG. 2) without any blank papers. That is, a user of the apparatus 100 may be requested (i.e., prompted) to remove any blank papers from the input tray, and place the documents 106 in the input tray after removal of the blank papers. The copy implementation module 110 may use the scanner 102 to scan the documents 106 from the input tray. The copy implementation module 110 may generate a prompt to place blank papers in the input tray. That is, in order to generate copies of the documents 106 after scanning, the user may be requested (i.e., prompted) to place blank papers in the input tray. Further, the copy implementation module 110 may generate the copies of the documents 106 based on the scan of the documents 106 from the input tray. That is, once the documents 106 are scanned to memory, the scanned information for the documents 106 may be used to generate copies of the documents 106.

Alternatively, in response to a determination that the page count of the documents 106 to be copied is not available, the copy implementation module 110 may scan the documents 106 from an input tray upon removal of any blank papers from the input tray (e.g., based on a signal that indicates removal of any blank papers from the input tray) and placement of the documents 106 in the input tray, and generate the copies of the documents 106 based on the scan of the documents 106 from the input tray.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

Referring to FIG. 2, according to examples, for the printer that includes the apparatus 100, or for a printer that operates in conjunction with a separately disposed apparatus 100 (excluding the scanner 102), fixing film 112 may be used to heat and fix toner on the documents 106. A pressure roller 114 may be configured to apply pressure on the fixing film 112 to fix the toner on the documents 106. A fixing delivery roller 116 may be configured to deliver the documents 106 after the fixing film 112 and the pressure roller 114. A duplex feed roller 118 may be configured to deliver the documents 106 into a duplex document path 120 (shown as dotted lines in FIG. 2) after the simplex document path 122 (shown as solid lines in FIG. 2) is completed. A duplex re-pickup roller 124 may be configured to pick up the documents 106 in the duplex document path. A photosensitive drum 126 may be configured to create the developed image with negative-charged toner. A transfer roller 128 may be configured to apply a positive charge to attract the negative-charged toner. A registration roller 130 may be configured to deliver the documents 106 into an electrophotographic (EP) process. A multipurpose tray pickup roller 132 may be configured to pick up the documents 106 from a multipurpose tray. A multipurpose tray separation pad 134 for the multipurpose tray may be configured to provide for delivery of a single document of the documents 106 (and blank papers) at any given time. A cassette separation pad 136 for an upper cassette may be configured to provide for delivery of a single document of the documents 106 at any given time. A cassette pickup roller 138 for the upper cassette may be configured to pick up a document of the documents 106 (and blank papers) from the upper cassette. A cassette separation pad 140 for a lower cassette may be configured to provide for delivery of a single document of the documents 106 at any given time. A cassette pickup roller 142 for the lower cassette may be configured to pick up a document of the documents 106 (and blank papers) from the lower cassette.

Figure 4:
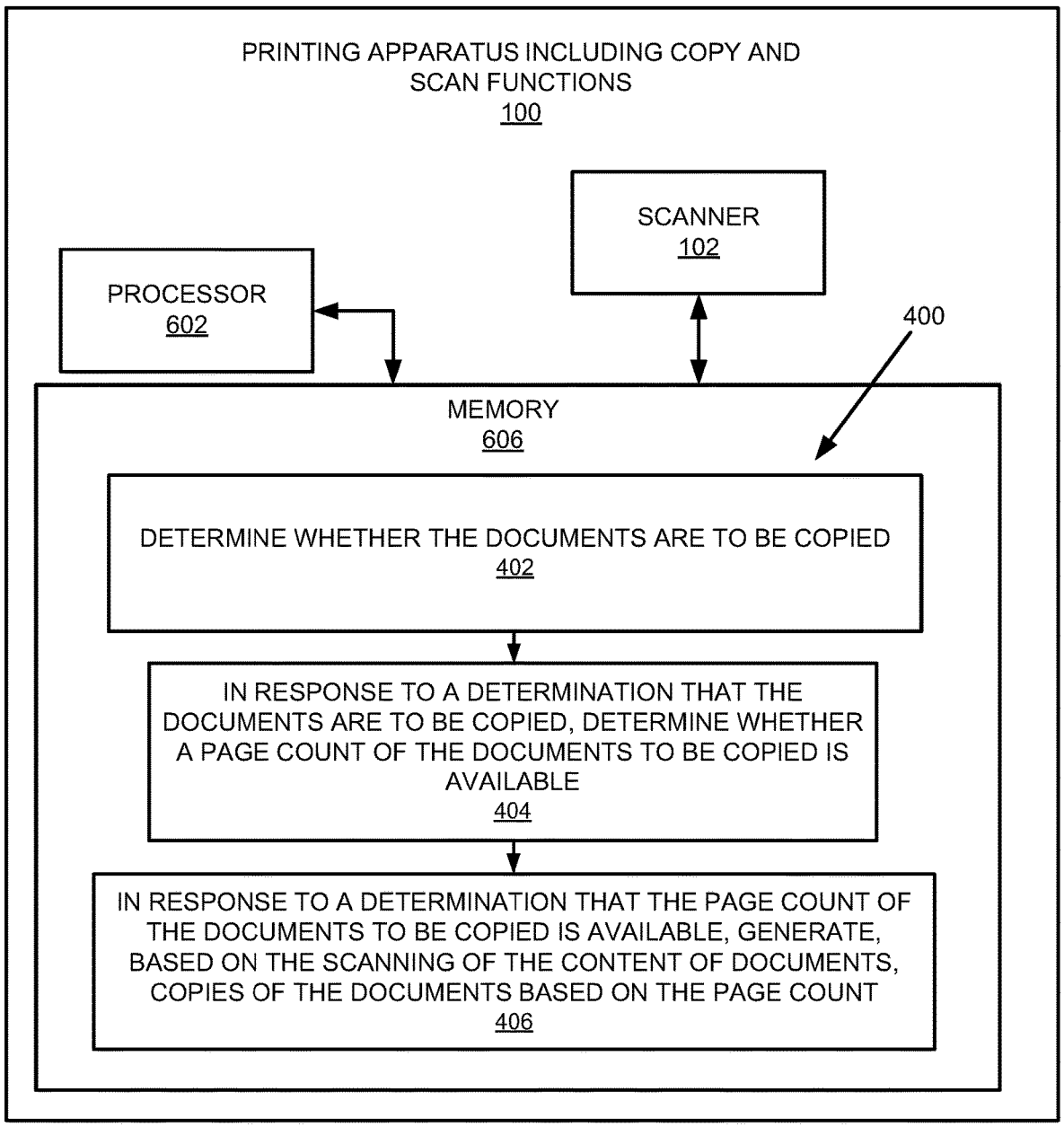
FIG. 4 illustrates another flowchart of a method for copying and scanning, according to an example of the present disclosure.
Figure 5:
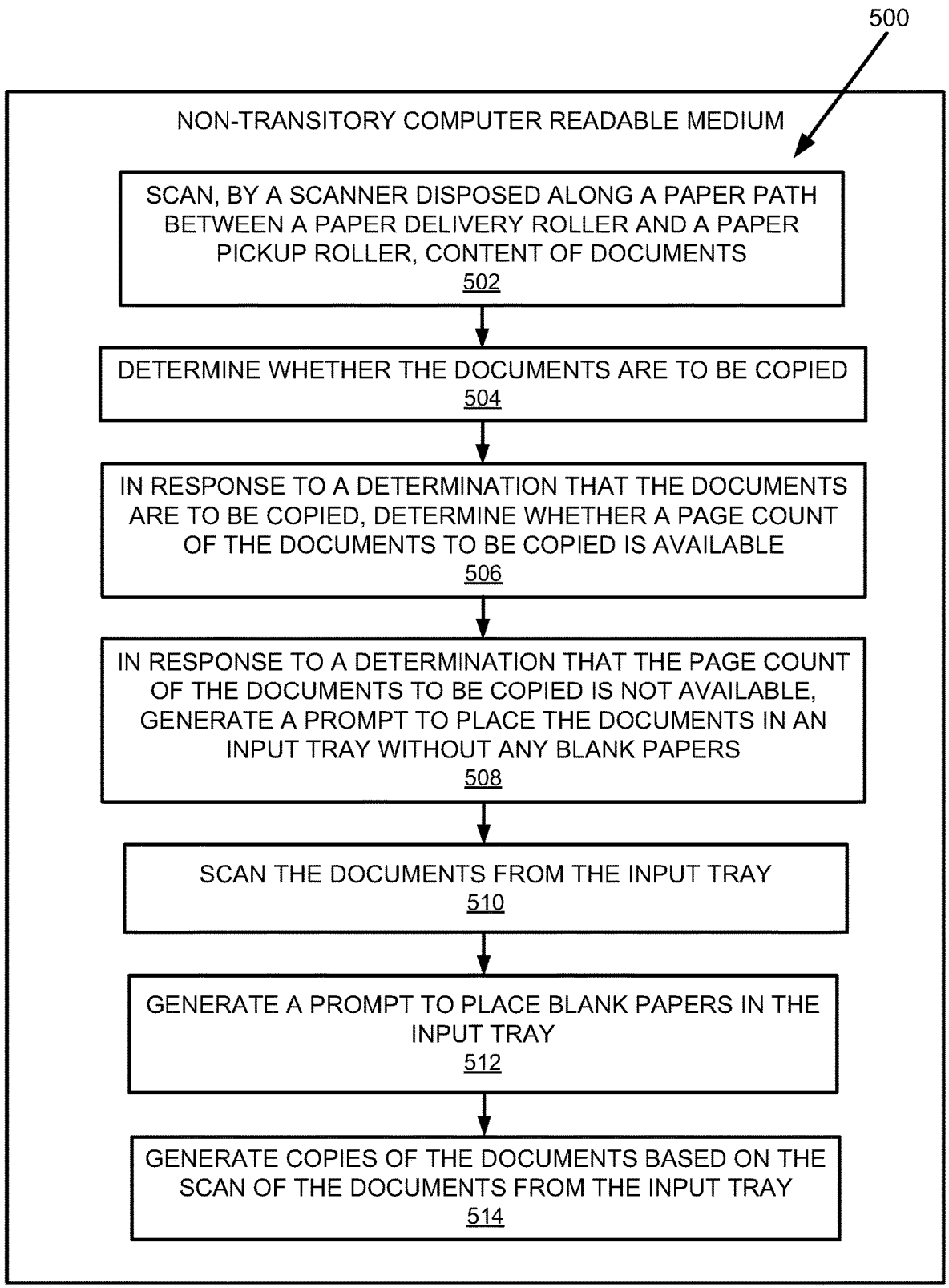
FIG. 5 illustrates another flowchart of a method for copying and scanning, according to an example of the present disclosure.

FIGS. 3-5 respectively illustrate flowcharts of methods 300, 400, and 500 for copying and scanning, corresponding to the example of the apparatus 100 whose construction is described in detail above. The methods 300, 400, and 500 may be implemented on the apparatus 100 with reference to FIGS. 1 and 2 by way of example and not limitation. The methods 300, 400, and 500 may be practiced in other apparatus. The example of FIG. 4 may represent a method that is implemented on the apparatus 100 that includes a processor 602 (see FIG. 6), and a memory 606 (see FIG. 6) storing machine readable instructions that when executed by the processor cause the processor to perform the method 400. The example of FIG. 5 may represent a non-transitory computer readable medium having stored thereon machine readable instructions for copying and scanning, the machine readable instructions, when executed, cause a processor (e.g., the processor 602 of FIG. 6) to perform the method 500.

Referring to FIGS. 1-3, for the method 300, at block 302, the method may include scanning, by a scanner 102 disposed along a paper path between a paper delivery roller 104 and a paper pickup roller, content of documents 106.

At block 304, the method 300 may include determining (e.g., by the copy determination module 108) whether the documents 106 are to be copied.

At block 306, in response to a determination that the documents 106 are to be copied, the method may include determining (e.g., by the copy determination module 108) whether a page count of the documents 106 to be copied is available.

At block 308, in response to a determination that the page count of the documents to be copied is not available, the method may include scanning (e.g., by the scanner 102) the documents from an input tray upon removal of any blank papers from the input tray and placement of the documents in the input tray.

At block 310, the method 300 may include generating (e.g., by the copy implementation module 110) copies of the documents 106 based on the scan of the documents 106 from the input tray.

According to examples, in response to a determination that the page count of the documents 106 to be copied is available, the method 300 may include generating (e.g., by the copy implementation module 110), based on the scanning of the content of documents 106, the copies of the documents 106 based on the page count.

According to examples, for the method 300, generating the copies of the documents 106 based on the page count, may further include scanning the content of the documents 106 from the input tray based on the page count, and generating (e.g., by the copy implementation module 110), based on the scanning of the content of the documents 106, the copies of the documents 106 based on the page count.

Referring to FIGS. 1, 2, and 4, for the method 400, at block 402, the method may include determining (e.g., by the copy determination module 108) whether the documents 106 are to be copied.

At block 404, in response to a determination that the documents 106 are to be copied, the method 400 may include determining (e.g., by the copy determination module 108) whether a page count of the documents 106 to be copied is available.

At block 406, in response to a determination that the page count of the documents 106 to be copied is available, the method 400 may include generating (e.g., by the copy implementation module 110), based on the scanning (e.g., by a scanner 102 disposed along a paper path between a paper delivery roller 104 and a paper pickup roller) of the content of documents 106, copies of the documents 106 based on the page count.

According to examples, for the method 400, generating, based on the scanning of the content of documents 106, the copies of the documents 106 based on the page count, may further include scanning of the content of the documents 106 from an input tray based on the page count, and generating, based on the scanning of the content of the documents 106, the copies of the documents 106 based on the page count.

According to examples, in response to a determination that the page count of the documents to be copied is not available, the method 400 may further include generating a prompt to place the documents 106 in an input tray without any blank papers, scanning the documents 106 from the input tray, generating a prompt to place blank papers in the input tray, and generating the copies of the documents 106 based on the scan of the documents 106 from the input tray.

According to examples, in response to a determination that the page count of the documents to be copied is not available, the method 400 may further include scanning the documents from an input tray upon removal of any blank papers from the input tray and placement of the documents in the input tray, and generating the copies of the documents based on the scan of the documents from the input tray.

Referring to FIGS. 1, 2, and 5, for the method 500, at block 502, the method may include scanning, by a scanner 102 disposed along a paper path between a paper delivery roller 104 and a paper pickup roller, content of documents 106.

At block 504, the method 500 may include determining (e.g., by the copy determination module 108) whether the documents 106 are to be copied.

At block 506, in response to a determination that the documents are to be copied, the method 500 may include determining (e.g., by the copy determination module 108) whether a page count of the documents 106 to be copied is available.

At block 508, in response to a determination that the page count of the documents to be copied is not available, the method 500 may include generating (e.g., by the copy implementation module 110) a prompt to place the documents in an input tray without any blank papers.

At block 510, the method 500 may include scanning (e.g., by the scanner 102) the documents 106 from the input tray.

At block 512, the method 500 may include generating (e.g., by the copy implementation module 110) a prompt to place blank papers in the input tray.

At block 514, the method 500 may include generating (e.g., by the copy implementation module 110) copies of the documents 106 based on the scan of the documents from the input tray.

According to examples, in response to a determination that the page count of the documents to be copied is available, the method 500 may include generating, based on the scanning of the content of documents 106, the copies of the documents 106 based on the page count.

Figure 6:
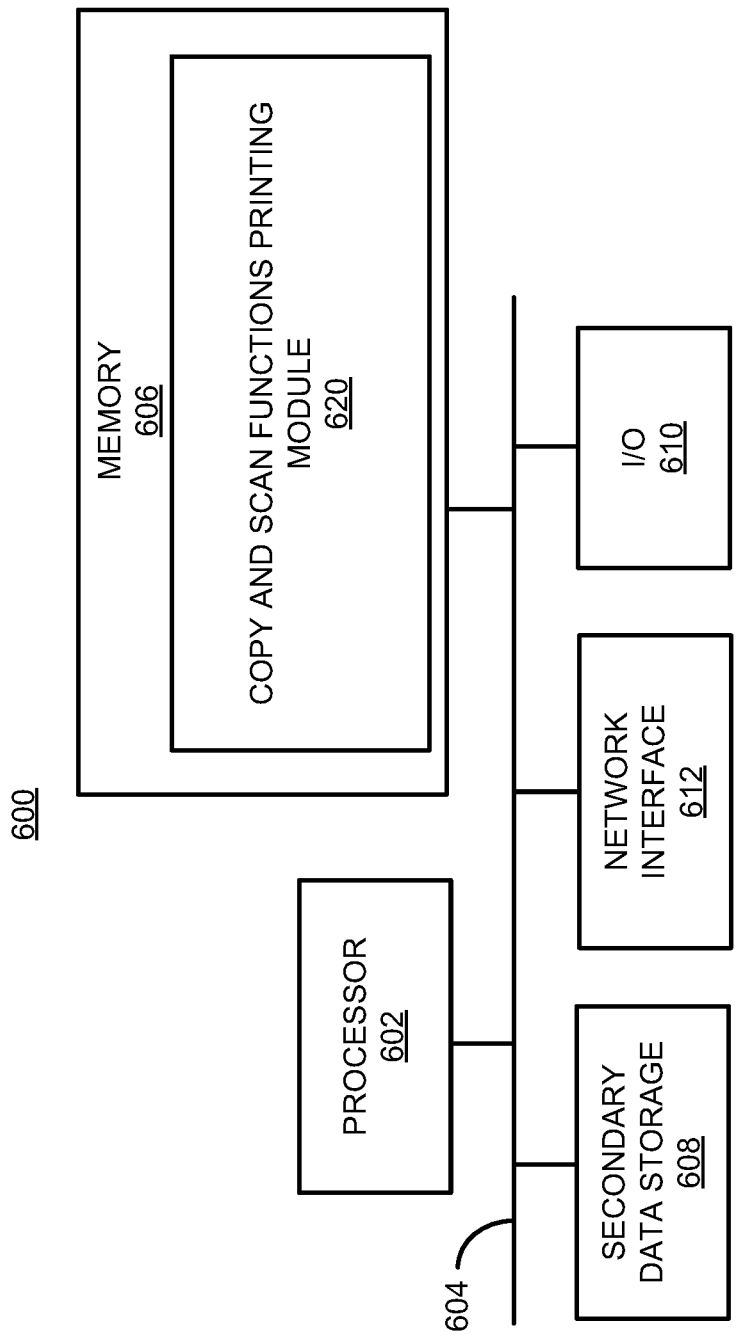
FIG. 6 illustrates a computer system, according to an example of the present disclosure.

FIG. 6 shows a computer system 600 that may be used with the examples described herein. The computer system 600 may represent a generic platform that includes components that may be in a server or another computer system. The computer system 600 may be used as a platform for the apparatus 100. The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM, ROM, EPROM, EEPROM, hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a RAM, where the machine readable instructions and data for the processor 602 may reside during runtime, and a secondary data storage 608, which may be non-volatile and stores machine readable instructions and data. The memory and data storage are examples of computer readable mediums. The memory 606 may include a copy and scan functions printing module 620 including machine readable instructions residing in the memory 606 during runtime and executed by the processor 602. The copy and scan functions printing module 620 may include the modules of the apparatus 100 shown in FIGS. 1 and 2.

The computer system 600 may include an I/O device 610, such as a keyboard, a mouse, a display, etc. The computer system may include a network interface 612 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A printing apparatus including copy and scan functions comprising:
   a scanner disposed along a paper path between a paper delivery roller and a paper pickup roller, the scanner configured to scan content of documents;
   a processor; and
   a memory storing machine readable instructions that when executed by the processor cause the processor to:
   determine whether the documents are to be copied;

in response to a determination that the documents are to be copied, determine whether a page count of the documents to be copied is available;

in response to a determination that the page count of the documents to be copied is not available, scan the documents from an input tray upon removal of any blank papers from the input tray and placement of the documents in the input tray; and generate copies of the documents based on the scan of the documents from the input tray.

2. The printing apparatus including copy and scan functions according to claim 1, wherein the machine readable instructions that when executed by the processor further cause the processor to:

in response to a determination that the page count of the documents to be copied is available, scan the content of the documents from the input tray based on the page count; and generate, based on the scanning of the content of the documents, the copies of the documents based on the page count.

3. The printing apparatus including copy and scan functions according to claim 2, wherein the input tray includes a cassette to load blank papers that are used to generate the copies.

4. The printing apparatus including copy and scan functions according to claim 2, wherein the input tray includes a multipurpose tray to load blank papers that are used to generate the copies.

5. The printing apparatus including copy and scan functions according to claim 1, further comprising machine readable instructions that when executed by the processor further cause the processor to:

in response to the determination that the page count of the documents to be copied is not available, generate a prompt to place the documents in the input tray without any blank papers;

scan the documents from the input tray;

generate a prompt to place blank papers in the input tray; and generate the copies of the documents based on the scan of the documents from the input tray.

6. The printing apparatus including copy and scan functions according to claim 1, wherein the input tray includes a cassette to load blank papers that are used to generate the copies.

7. The printing apparatus including copy and scan functions according to claim 1, wherein the input tray includes a multipurpose tray to load blank papers that are used to generate the copies.

8. The printing apparatus including copy and scan functions according to claim I, wherein the printing apparatus including copy and scan functions comprises a laser printer.

9. The printing apparatus including copy and scan functions according to claim 1, wherein the printing apparatus including copy and scan functions comprises an inkjet printer.

10. A method for copying and scanning, the method comprising:

scanning, by a scanner disposed along a paper path between a paper delivery roller and a paper pickup roller, content of documents;

determining, by a processor, whether the documents are to be copied;

in response to a determination that the documents are to be copied, determining whether a page count of the documents to be copied is available;

in response to a determination that the page count of the documents to be copied is not available, scanning the documents from an input tray upon removal of any blank papers from the input tray and placement of the documents in the input tray; and generating copies of the documents based on the scan of the documents from the input tray.

11. The method of claim 10, further comprising:

in response to a determination that the page count of the documents to be copied is available, generating, based on the scanning of the content of documents, the copies of the documents based on the page count.

12. The method of claim 11, wherein generating the copies of the documents based on the page count, further comprises:

scanning the content of the documents from the input tray based on the page count; and generating, based on the scanning of the content of the documents, the copies of the documents based on the page count.

13. A non-transitory computer readable medium having stored thereon machine readable instructions for copy and scan printing, the machine readable instructions, when executed, cause a processor to:

scan, by a scanner disposed along a paper path between a paper delivery roller and a paper pickup roller, content of documents;

determine whether the documents are to be copied;

in response to a determination that the documents are to be copied, determine whether a page count of the documents to be copied is available;

in response to a determination that the page count of the documents to be copied is not available, generate a prompt to place the documents in an input tray without any blank papers;

scan the documents from the input tray;

generate a prompt to place blank papers in the input tray; and generate copies of the documents based on the scan of the documents from the input tray.

14. The non-transitory computer readable medium according to claim 13, further comprising machine readable instructions that when executed by the processor further cause the processor to:

in response to a determination that the page count of the documents to be copied is available, generate, based on the scanning of the content of documents, the copies of the documents based on the page count.

* * * * *